Patented June 24, 1924.

1,498,913

UNITED STATES PATENT OFFICE.

RICHARD HERZ, OF FRANKFORT-ON-THE-MAIN, AND JENS MÜLLER, OF HANAU, GERMANY.

VAT DYES OF THE THIOINDIGO SERIES AND PROCESS OF MAKING SAME.

No Drawing. Application filed February 7, 1924. Serial No. 691,276.

*To all whom it may concern:*

Be it known that we, RICHARD HERZ, a citizen of the German Republic, residing at Frankfort-on-the-Main, Germany, and JENS MÜLLER, a citizen of the German Republic, residing at Hanau, Germany, have invented new and useful Vat Dyes of the Thioindigo Series and Processes of Making Same, of which the following is a full description.

We have found that o-aminoarylthioglycolic acids of the following general formula:

wherein Ar indicates an arylgroup, which may or may not otherwise contain substituents (such as alkyl halogen, oxyalkyl). X indicates: $NH_2$, NH acyl and the group :—N=N azocomponent and Y indicates: hydrogen which may be substituted by a metal.

Their probable constitution is represented by the following general structural formula:

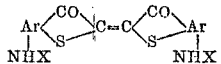

wherein Ar indicates an arylgroup which may or may not otherwise contain substituents (such as alkyl halogen, oxyalkyl), and X indicates hydrogen which may be substituted by an acylgroup, and in which the S-atom of the thioindigo ring stands in o-position to NHX.

The o-aminoarylthioglycolic acids for instance may be advantageously produced as described in Brit. Pat. No. 18292/1914 by condensing the products of reaction of disulfurdichloride on primary aromatic amines with monochloroacetic acid or by any other suitable known processes.

For the present reaction they are best employed in form of their dry salts, preferably their difficultly soluble heavy metal salts. Equally good results are obtained if the acyl preferably the acetyl compounds of the o-aminoarylthioglycolic acids are subjected to the reaction. Finally suitable azodyestuffs, prepared by diazotizing the o-aminoarylthioglycolic acids and coupling them with azodyestuff components particularly with phenols, naphtols or their sulfonic acids, may be treated with acid condensing agents. The dyestuffs thus obtained still contain the azo group in their molecule, by treating them with reducing agents in substance or by dyeing them in the vat the azo group is split and the vat dyestuffs are produced in substance or on the fibre.

Chlorosulfonic acid alone or in mixture with concentrated sulfuric acid, sulfuric acid monohydrate or fuming sulfuric acid has proved to be a satisfactorily working condensing agent and the reaction may in some cases be accelerated and the yield be improved by the addition of a suitable catalyst as for instance boric or phosphoric acid, or salts or sulfides of heavy metals and so forth.

The condensation of the o-aminoarylthioglycolic acids and the oxidation to the vat dyestuffs mostly takes place simultaneously, but the reaction may also be carried out in two separate phases.

The condensation of the o-aminoarylthioglycolic acids may be carried out at so low a temperature that only the oxythionaphthenes or naphthoxypenthiophenes respectively, are formed which then can be oxidized to the dyestuffs in a sepaarte action. By this variation of the process the formation of by-products can be avoided.

The following examples illustrate the nature of our invention and in what manner it is to be performed.

Example I.

An aqueous solution of the sodium salt of the (1) methyl (5) chloro, (2) aminophenyl (3) thioglycolic acid, is prepared by condensing the product of reaction

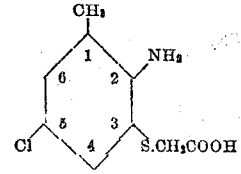

of disulfurdichloride on o-toluidine with monochloroacetic acid in a dilute caustic soda solution. This process is in detail described in Brit. Pat. No. 18292/1914. This solution is then neutralized and an excess of coppersulfate is added whereby the difficultly soluble copper salt, is separated, it is filtered, washed and dried.

5 kilos of the copper salt thus produced are well ground and gradually introduced whilst stirring to 40 to 50 kilos of sulfuric acid monohydrate, care should be taken that the temperature of the mass does not rise above 50° C.

It is then cooled down to ordinary temperature and a mixture of about 10 volumes of fuming sulfuric acid (of 20% $SO_3$) and 20 volumes of chlorosulfonic acid are allowed to run in slowly. The temperature commences again to rise and the color of the mass becomes steel blue to deep pure blue. After standing for some hours the mass is warmed to about 50° C. and kept at this temperature until the formation of the dyestuff is finished.

The mass is then cooled down and poured on to ice. The dyestuff produced, separates as a dark blue precipitate it is filtered, washed until it is neutral and purified if necessary by extracting it with a warm dilute sodium carbonate or caustic soda solution. In a dry state it forms a dark blue powder insoluble in water and the usual organic solvents, soluble with a pure blue color in concentrated sulfuric acid, forming with an alkaline hydrosulfite solution a greenish yellow vat and dyeing animal and vegetable fibre from such a bath grey blue to dark blue shades fast to severe washing, milling and light.

Instead of the copper salt other suitable salts as for instance the carefully dried zinc or sodium salt of the above named o-aminoarylthioglycolic acid may be used, and similar dyestuffs are obtained if o-aminoarylthioglycolic acids of the following structural formula:

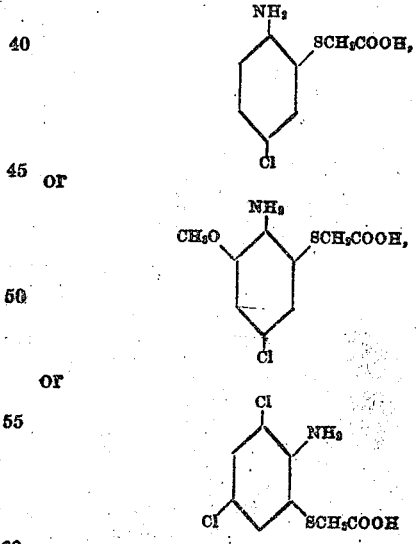

are subjected to the same process.

*Example 2.*

An aqueous solution of the sodium salt of the o-aminoarylthioglycolic acid of the foregoing example is diazotized and then combined in the usual manner with the corresponding quantity of β naphtholdisulfonic acid R. The azodyestuff thus prepared is salted out, filtered and dried.

The conversion of it to the dyestuff of the thioindigo series is carried out as described in Example 1. Thus produced it still contains the azo radical and dissolves with a claret red color in water. By treating it with suitable reducing agents, for instance by warming it with a sodiumsulfide solution, or if dyed in an alkaline hydrosulfite solution the azo-group is split and a vat dyestuff is obtained which in all its properties is identical with that of the foregoing example.

*Example 3.*

An aqueous solution of the sodium salt of the (2) aminonaphthalene (1) thioglycolic acid is prepared for instance as described in Brit. Pat. No. 18292/1914 by condensing 18 kilos of the product of reaction of disulfurdichloride on β naphthylaminehydrochloride with the corresponding quantity of monochloroacetic acid in dilute caustic soda solution. For the formation of the acetyl compound it is almost neutralized and then 10 kilos of acetic acid anhydride are at once added to it whilst stirring vigorously. The acetylation is finished within a short while, the solution is then acidified with mineral acids and allowed to stand for some time whereby the (2) acetylamino-naphthalene (1) thioglycolic acid separates in form of a white crystalline precipitate. It is filtered and dried, its melting point in a pure state is 185° C.

40 kilos of the well ground (2) acetylaminonaphthalene (1) thioglycolic acid thus produced are stirred into about five times their quantity of chlorosulfonic acid whilst cooling well; stirring is continued until all the acid is gone into solution and care is taken, that the temperature of the mass during the whole time of the reaction, does not rise considerably above 0° C. For finishing the reaction the mass is allowed to stand for some hours and then poured on ice, filtered and washed with water until it is neutral.

The product of condensation "the penthiophene derivative" of the following probable structural formula:

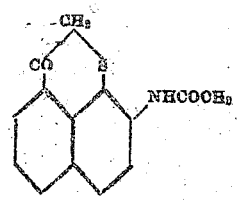

is thus obtained in form of a yellowish crystalline precipitate, for converting it into the vat dyestuff it is mixed with some spirit, or pyridine or similar acting dissolving agents and then dissolved by the addition of the necessary amount of caustic soda solution. The solution is then diluted with water and oxidized by passing through a vigorous current of air. The vat dyestuff of the following presumable formula:

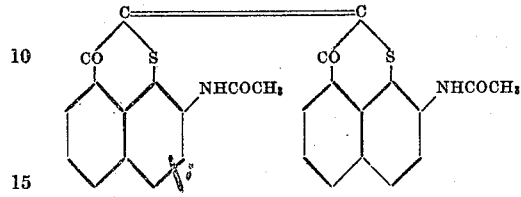

separates in greenish blue flakes it is filtered, well washed and thus obtained in a finely divided paste which is well adapted for dyeing and printing purposes. It dyes cotton in an alkaline hydrosulfite solution, preferably at ordinary temperature greenish blue shades which are distinguished by their unusual brightness and their excellent fastness to light.

Having now particularly described and set forth the matter of our said invention and in what manner the same is to be performed, we declare that what we claim is:

1. As new products the vat dyes of the thioindigo series derived by condensation with acid condensing agents from o-aminoarylthioglycolic acids of the following general formula:

wherein Ar denotes an arylgroup which may or may not otherwise contain substituents such as alkyl, halogen, oxyalkyl, X indicates $NH_2$, NH acyl and the group — N = N azocomponent and Y indicates hydrogen which may be substituted by a metal, those dyestuffs possessing the following general structural formula:

wherein Ar signifies an arylgroup, which may or may not otherwise contain substituents such as alkyl, halogen, oxyalkyl, X indicates hydrogen which may be substituted by an acylgroup, and in which the S atom of the thioindigo ring stands in the o-position to "NHX" being in a dry state dark colored powders, insoluble in water and the usual organic solvents, forming with an alkaline hydrosulfite solution easily soluble yellowish colored vats from which animal and vegetable fibres are dyed varying shades ranging from blue to black which are distinguished by their especially good fastness to light.

2. The herein described new vat dyestuff of the following probable constitutional formula:

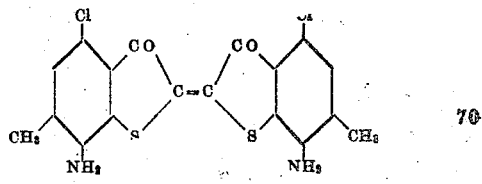

derived by condensation with acid condensing agents from the (1) methyl (5) chloro- (2) aminophenyl (3) thioglycolic acid, being in a dry state a dark blue powder insoluble in water and in the usual organic solvents, soluble with a pure blue color in concentrated sulfuric acid, forming with an alkaline hydrosulfite solution a greenish yellow vat and dyeing wool and cotton from such a bath grey blue to dark blue shades fast to milling, severe washing and light.

3. The herein described new vat dyestuff, of the following probable constitution:

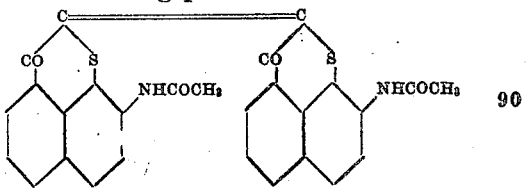

derived from the (2) acetylaminonaphthalene (1) thioglycolic acid by condensing it with acid condensing agents to the penthiophene derivative of the following probable constitution:

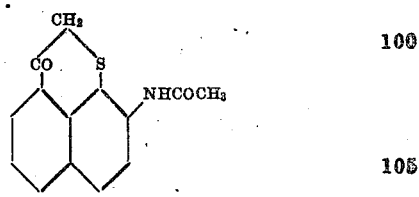

and by subsequent oxidation of the latter being in a dry state a blue powder insoluble in water and the usual organic solvents, dissolving with partial destruction in concentrated sulfuric acid, forming with alkaline hydrosulfite solution a yellowish olive colored vat and dyeing cotton from such a bath at temperatures preferably not exceeding 30° C. greenish blue shades which are distinguished by their unusual brightness and their excellent fastness to light.

In witness whereof we have hereunto signed our names this 18th day of January 1924.

RICHARD HERZ.
JENS MÜLLER.

Witnesses:
HERBERT STEIGER,
GABRIELE FLESCH.

Certificate of Correction.

It is hereby certified that in Letters Patent No. 1,498,913, granted June 24, 1924, upon the application of Richard Herz, of Frankfort-on-the-Main, and Jens Müller, of Hanau, Germany, for an improvement in "Vat Dyes of the Thioindigo Series and Processes of Making Same," errors appear in the printed specification requiring correction as follows: Page 1, line 23, after the word "metal" strike out the period and insert a comma and the words , *if treated with acid condensing agents are converted into new and very useful dyestuffs of the thioindigo series, dyeing animal and vegetable fibres in the alkaline hydrosulfite vat varying shades ranging from blue to black, which are distinguished by their especially good fastness to light;* same page, line 83, for the misspelled word "sepaarte" read *separate;* and that the said Letters Patent should be read with these corrections therein that the same may conform to the record of the case in the Patent Office.

Signed and sealed this 2d day of September, A. D. 1924.

[SEAL.]                                        KARL FENNING,
*Acting Commissioner of Patents.*